United States Patent [19]
Miller, III

[11] 3,960,730
[45] June 1, 1976

[54] EMBOSSED SUPPORT FOR DIALYZER MEMBRANE

[75] Inventor: Frederick W. Miller, III, Glenmore, Pa.

[73] Assignee: Extracorporeal Medical Specialties Inc., King of Prussia, Pa.

[22] Filed: Sept. 26, 1974

[21] Appl. No.: 509,671

[52] U.S. Cl. .................. 210/321 A; 210/494 M; 210/321 B; 210/497.1
[51] Int. Cl.² ................................. B01D 31/00
[58] Field of Search ............ 210/22, 321, 493, 494, 210/541

[56] References Cited
UNITED STATES PATENTS

| | | | |
|---|---|---|---|
| 2,816,665 | 12/1957 | Layte et al. | 210/494 |
| 3,508,662 | 4/1970 | Miller | 210/541 |
| 3,738,813 | 6/1973 | Esmond | 210/494 |
| 3,753,712 | 8/1973 | Jamneck et al. | 210/321 |
| 3,796,313 | 3/1974 | Luppi | 210/321 |
| 3,813,334 | 5/1974 | Bray | 210/321 |
| 3,852,198 | 12/1974 | Murakami | 210/321 |
| 3,853,769 | 12/1974 | Miller | 210/321 |

Primary Examiner—Theodore A. Granger
Attorney, Agent, or Firm—Connolly and Hutz

[57] ABSTRACT

An extracorporeal, disposable, dialyzer for use in a variety of artificial kidney or other mass transfer systems, which includes a sheet of support material rolled up in a spiral with a flattened tube of membrane material, the sheet of support material includes a large number of embossments protruding from each side thereof and arranged in similar geometrical patterns which are angularly off-set with respect to each other so that the summits of the embossments on one side are spaced apart differently along any given directional line than the directly opposed summits of the embossments on the other side, thus when the sheet of support material is rolled up in a spiral the summits of the embossments avoid interdigitation which would substantially occlude the blood passage formed by the tube of membrane material.

9 Claims, 6 Drawing Figures

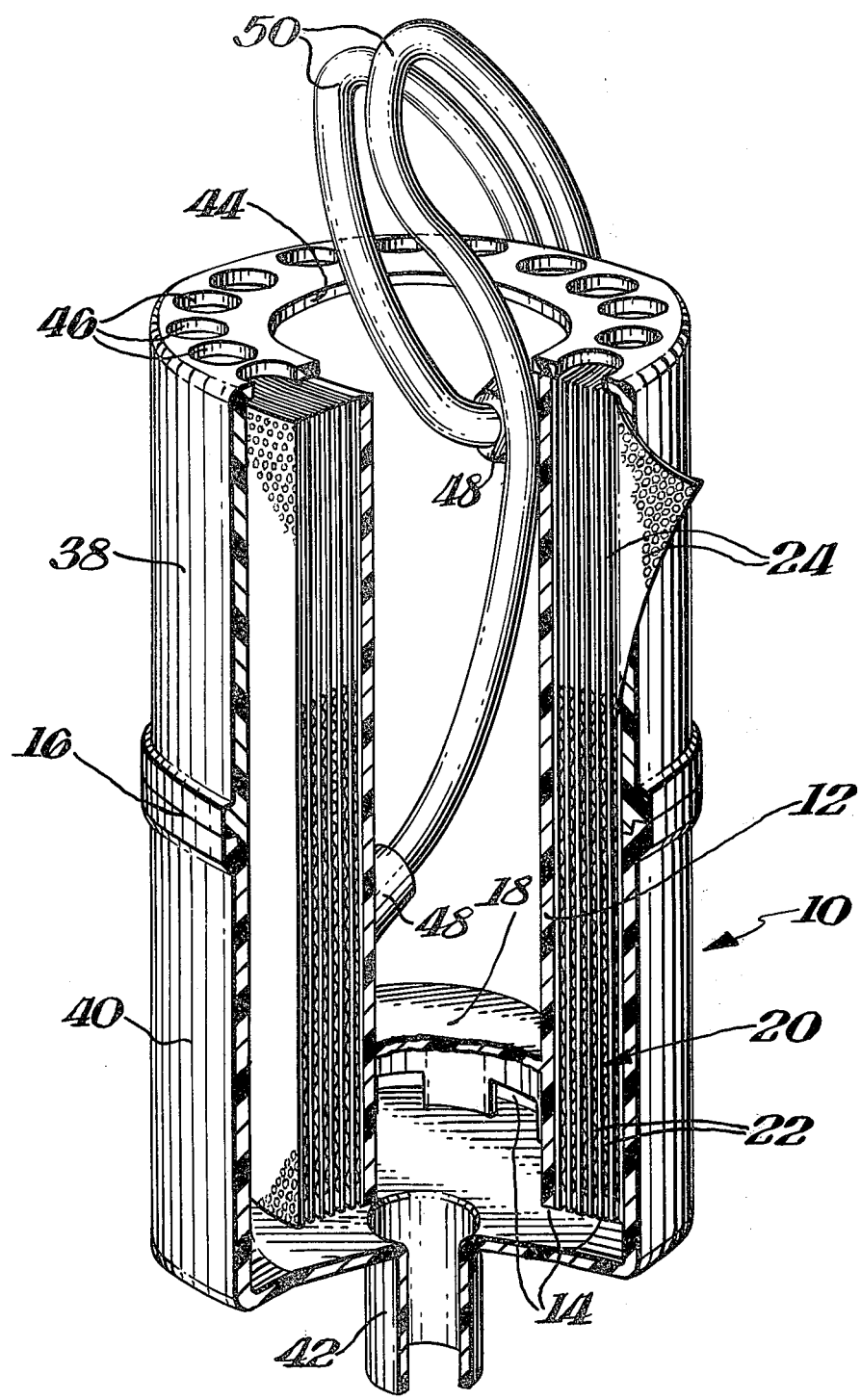

EMBOSSED SUPPORT FOR DIALYZER MEMBRANE

BACKGROUND OF THE INVENTION

This invention relates to mass transfer devices in which different fluids are exposed to opposite sides of a semi-permeable membrane so that one or more components of one fluid will pass through the membrane to the other fluid, and more particularly to embossed material for supporting the flexible membrane material in blood dialyzers for use as artificial kidneys.

Prior to the present invention, a great variety of suggestions have been published for supporting the usually thin and flexible membrane in mass transfer devices, and particularly in dialyzer devices, some of which have been exploited commercially and some of which have not. The present invention will be described in terms of a dialyzer coil for use as an artificial kidney, although it is to be understood that the invention is not limited to the same because the support material of this invention is useful in flat plate and other types of blood dialyzers as well as other types of mass transfer devices.

Dialyzer coil designs which have been exploited commercially utilize mesh or netting material made up of intersecting strands as a support for the flattened tubular membranes. Early coils such as those disclosed in Metz U.S. Pat. No. 2,880,501 issued Apr. 7, 1959, and Broman U.S. Pat. No. 2,969,150 issued Jan. 24, 1961, utilize an over-and-under woven type of mesh material. A significant improvement in commercial dialyzer coil design was brought about by the use of a particular non-woven plastic netting disclosed by Dr. Theodor Kolobow in "A New Dynamic Disposable Artificial Kidney", *Transactions, American Society For Artificial Internal Organs*, Volume X, pages 116–120 (1964), and *Proceedings, Conference on Hemodialysis*, (Nov. 9–10, 1964) National Institute of Health, Bethesda, Md., pages 87–94. The same non-woven plastic netting is disclosed as being useful in a multiple-start-spiral design of dialyzer coil in Hoeltzenbein U.S. Pat. No. Re. 27,510 issued Oct. 24, 1972, an improved orientation for the non-woven strands of such netting is disclosed in Miller U.S. Pat. No. 3,508,662 granted Apr. 28, 1970, and a particular cross-sectional shape for such strands is disclosed in Martinez U.S. Pat. No. 3,709,367 issued Jan. 9, 1973.

Membrane support material which does not make use of intersecting strands arranged in the form of a mesh or netting has also been proposed, and used to some extent commercially, although it is believed that such material has not met with any significant commercial success to date in disposable type dialyzers, particularly the popular coil types. Gobel and Bluemle U.S. Pat. No. 3,077,268 granted Feb. 12, 1963, discloses a dialyzer coil utilizing a support material comprising radially impervious plastic sheet having "hobnail" embossments protruding from the opposite sides thereof. This material is disclosed (FIGS. 1–6) as being useful in a coil design where the support material is located outside the flattened tube of membrane material so that the blood passage within the tube is relatively long and spirally directed and essentially linear in cross-section, and the passage for the dialysate is relatively short and axially directed and spiral in cross-section; and, also is suggested (FIG. 7) for use in conjunction with the known alternative coil design where the operation is reversed with an elongated sheet of support material located inside the flattened tube of membrane material. To avoid interdigitation of the peaks of the hobnail protrusions 36 which would substantially occlude the blood passage in the first design, the Gobel and Bluemle patent provides a series of large protrusions 34 and a thickened separator rim 21 having a longitudinal groove 24 on one side and cooperating disc-shaped projections 25 on the other side to prevent axial shifting of adjacent turns or wraps of the coil. To avoid interdigitation which would substantially occlude the blood passage in the second alternative design, the coil desirably is provided with end cheek plates of the type known from the aforesaid Kolobow publications to prevent axial shifting of adjacent turns or wraps of the coil. Bluemle U.S. Pat. No. 3,362,540 issued Jan. 9, 1968, discloses a membrane support for a flat plate type of dialyzer which has embossments which take the form of hexagonal based cones which are rounded at their tops, but in this device interdigitation of the opposed protrusions which would substantially occlude the blood passage is avoided as a problem during operation by the use of spacers at the edges. See also the Progress Reports of Dr. Bluemle for the period 1 November 1960 to 31 October 1961, and the period 1 November 1961 to 31 October 1962, available from the Armed Services Technical Information Agency under AD-266-102 and AD-291-891, respectively, Esmond U.S. Pat. No. 3,695,445 issued Oct. 3, 1972, and Janneck U.S. Pat. No. 3,753,712 issued Aug. 21, 1973. In the coil and flat plate devices disclosed in these patents and publications, the embossments always are arranged in identical geometrical patterns which are not angularly off-set with respect to each other so that the embossments on one side of the blood passage are spaced apart exactly the same along any given directional line as the directly opposed embossments on the other side of the blood passage, and this creates the unacceptable possibility that the opposed embossments can interdigitate and substantially occlude the blood passage, and also the passage for dialysate, unless special spacing features are provided as aforesaid.

Thus, the problems heretofore unsolved by the prior art are the provision of membrane support, which does not make use of intersecting strands arranged in the form of either a woven mesh or a non-woven netting, consisting essentially of embossed material which positively avoids interdigitation of the embossments to an extent which would substantially occlude the blood and dialysate passages yet does so without the necessity of providing special expensive and/or cumbersome positioning or spacing features to insure against such unacceptable interdigitation.

SUMMARY OF THE INVENTION

This invention provides an inexpensive, disposable mass transfer device, such as a dialyzer coil for use in artificial kidney machines, wherein the support material for the thin flexible membrane includes a large number of protruding embossments arranged in geometrical patterns which are different on opposite sides of the blood passage so that the summits of the embossments on one side of the blood passage are spaced apart differently along any given directional line than the directly opposed summits of the embossments on the other side so as positively to avoid interdigitation of the summits to an extent which would substantially and undesirably occlude the blood passage.

BRIEF DESCRIPTION OF THE DRAWINGS

Numerous advantages of the present invention will become apparent to one skilled in the art from a reading of the detailed description in conjunction with the accompanying drawings, wherein similar reference characters refer to similar parts, and in which.

DETAILED DESCRIPTION

Figure 1:
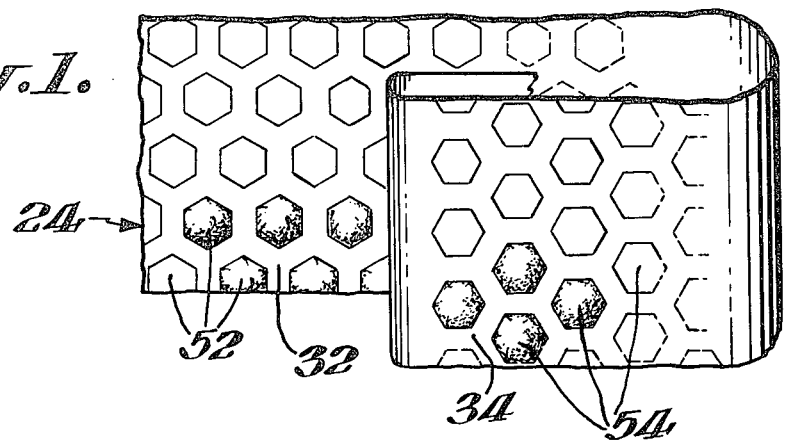
FIG. 1 is an enlarged view of a fragment of the support material according to this invention, having a portion rolled back upon itself in partial spiral array, showing the angularly off-set geometrical patterns of the embossments protruding from each side thereof.
Figure 2:
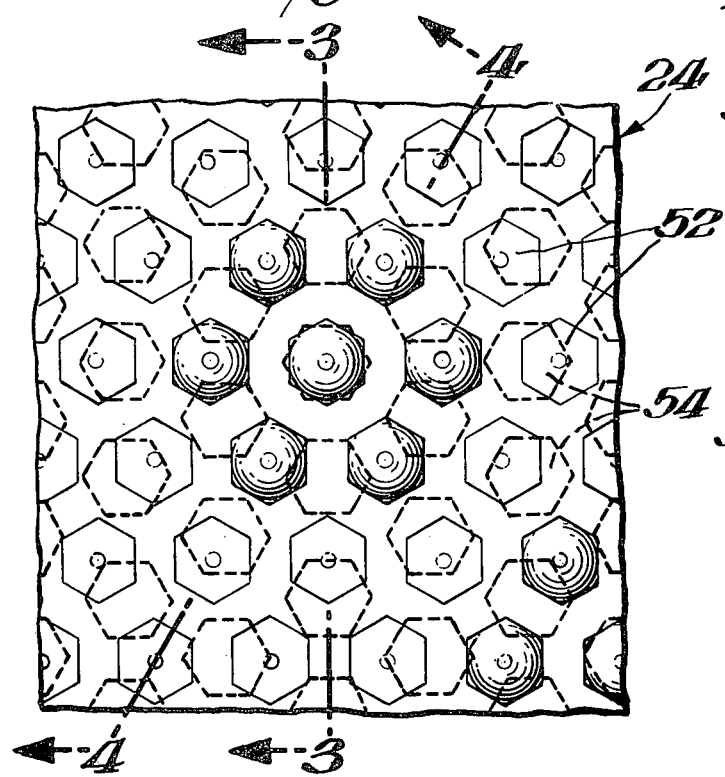
FIG. 2 is a greatly enlarged view of a fragment of the support material according to this invention showing the embossments and the patterns in which they are arranged in solid lines on the near side and in dashed outline on the far side thereof.

Referring in more particularity to the drawings, FIG. 6 shows one exemplary form of mass transfer device with which the embossed material for supporting permeable membrane according to this invention is useful. This comprises a coil type dialyzer unit 10 for use in artificial kidney machines.

The dialyzer unit 10 includes a generally cylindrical inner core member 12 made of rigid plastic material having dialysate inflow castellations 14 spaced around its lower end and a lateral internal baffle wall 18 to prevent dialysate from flowing upwardly through the interior of the core 12 and to direct the dialysate to flow through the inflow castellations 14 to the dialyzing portion of the unit.

The dialyzing portion 20 of the unit 10 consists of membrane material 22 and support material 24 rolled up together around the inner core member 12 in the general manner described in the aforementioned Miller U.S. Pat. No. 3,508,662. The membrane material 22 takes the form of an elongated flattened tube, one side providing a first section 26 of membrane material and the other side providing a second section 28 of membrane material positioned in close opposition to each other to provide between their inner surfaces a passage 30 which accommodates blood in smooth flow. The passage for the blood is relatively long and spirally directed outwardly and essentially linear in cross-section. The support material 24 according to this invention, which is described in greater detail below, consists essentially of a single sheet of plastic material including embossments protruding from each side thereof so that one side of the sheet provides a first section 32 of support material and the other side provides a second section 34 of support material for positioning adjacent the aforesaid sections of membrane material to provide passage 36 which accommodates dialysate in turbulent flow against the outer surfaces of the sections of membrane material. The passage for the dialysate is relatively short and axially directed upwardly and spiral in cross-section.

A rigid outer casing enclosing the unit consists essentially of an upper end cap 38 and a lower end cap 40 having cup-shaped configurations and being joined as at 16 at their rims. The base portion of the lower end cap 40 has a downwardly extending central tapered connector 42 adapted for engagement with a dialysate inflow opening of an artificial kidney machine to position the dialyzer coil unit thereon, and to provide for flow of dialysate into the unit. The base portion of the upper end cap 38 has a large central aperture 44 to provide access for blood tubing and a series of smaller apertures 46 located therearound to provide for flow of dialysate out of the dialyzer. The rigid outer casing is disclosed in greater detail in Miller U.S. Pat. No. 3,853,769 granted Dec. 10, 1974.

Means including adapters 48 are provided for connecting each end of the spiral blood passage 30 with tubing 50 for communication with the circulatory system of a patient (not shown). Similarly, the above described means for connecting each end of the axial passage 36 for dialysate with the dialysis system of an artificial kidney machine (not shown) are of the type which will be recognized as being useful with a fully recirculating dialysate system or one in which a recirculating system is used in combination with fresh dialysate addition. This invention is not confined, however, to such devices, because it also finds utility as a totally enclosed artificial kidney unit for use in a single pass system or "recirculating single pass" system utilizing negative dialysate pressure for fluid removal. As mentioned above, the support material described in greater detail below has utility in a wide variety of artificial kidney designs, including single layer and multiple layer types arranged in flat plate, stacked or coiled configurations, as well as other mass transfer devices including artificial lungs, artificial placentas, water purification devices, and the like. Thus, the foregoing disclosure of the preferred embodiment of the invention should not be interpreted as limiting the environment in which the invention may prove beneficial.

Referring with more particularity to FIGS. 1–5, the support material 24 comprises a first section 32 and a second section 34 which in the disclosed embodiment are the opposite sides of a single unitary sheet of material including embossments protruding from each side thereof. In the preferred embodiment, the sheet may be formed of a non-toxic thermoplastic material, such as polyethylene, polypropylene, or the like. The material may first be extruded as a flat sheet, and then formed in the presence of elevated temperatures between opposed rollers having patterns engraved thereon to provide the embossments. The plastic of which the support material is formed is radially impervious to the passage of dialysate, although it is contemplated that apertures through the base material between the embossments will not defeat the objectives of this invention.

The first section 32 of support material includes a plurality of embossments 52 the summits of which engage the outer surface of the first section of membrane material. The second section 34 of support material similarly includes a plurality of opposed embossments 54 the summits of which engage the outer surface of the second section of membrane material. The embossments 52 are of substantially equal size, and each has a width dimension at its base which is larger that the height dimension between its base and summit, although neither of these is believed to be an essential requirement. In the preferred embodiment, each has a width dimension at its base which is approximately twice as large as the height dimension between its base and summit, although this dimensional relationship will vary slightly if each embossment at its base takes the shape of a regular polygon rather that a circle, and vary to a greater degree if the base is ovoid or otherwise elongate. In the disclosed embodiment the base of each embossment 52 is a hexagon. Each embossment 52 merges from its base to a smoothly rounded summit which will support the membrane material with a minimum of surface contact yet without puncturing the same. In the preferred embodiment, the opposing embossments 54 are identical in size and shape with the embossments 52, although altering the size, shape or spacing of the embossments from one side with respect to the other will not defeat the objects of this invention provided the non-interdigitating pattern concept explained below is followed.

Figures 3, 4:
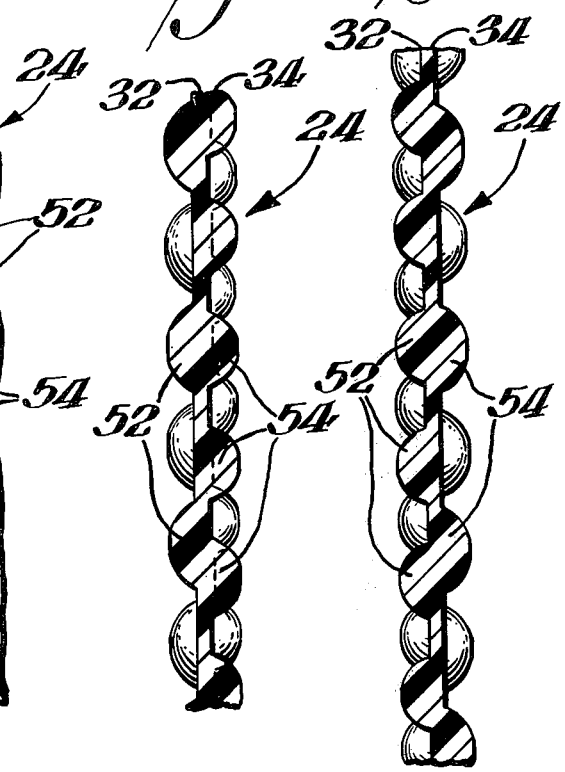
FIG. 3 is a sectional view on line 3—3 of FIG. 2 showing how the embossments on one side are spaced apart differently along one given directional line than the directly opposed embossments on the other side.
FIG. 4 is a sectional view on line 4—4 of FIG. 2 also showing how the embossments on one side are spaced apart differently along another given directional line than the directly opposed embossments on the other side.

The embossments 52 of the first section 32 of support material and the embossments 54 of the second section 34 of support material are arranged in patterns to avoid interdigitation of the summits which would substantially occlude the passage 30 for the blood. The patterns are such that the summits of the embossments on one side of the blood passage are spaced apart differently along any given directional line than the directly opposed summits of the embossments on the other side so as positively to avoid interdigitation of the summits to an extent which would undesirably occlude the passages for the blood and dialysate. With specific reference to FIGS. 2–4, it can be seen that the embossments 52 are spaced apart differently along any given directional line than the directly opposed embossments 54. FIG. 3 shows a section cut on the vertical, and it makes clear that the embossments 52 along that given directional line are spaced apart to a greater extent than the opposed embossments 54. FIG. 4 shows a section cut on an angle, and it also makes clear that the embossments 52 along that given directional line are spaced apart to a lesser extent than the opposed embossments 54. The spacing between the bases of any two adjacent embossments is slightly less than the width dimension of an embossment at its base, although other relationships are equally useful. It is one of the principles of this invention that the embossments of the first section of support material are spaced apart differently along any given directional line than the directly opposed embossments of the second section, which can be better understood and confirmed by placing a straight edge on FIG. 2 at any angle and determining that the embossments shown in solid lines are spaced apart differently along the straight edge than the embossments shown in dashed outline. In a coil type dialyzer device, the given directional line for checking this parameter will be curved in conformance with the angle of the line and the curve of the spiral, unless of course the directional line happens to be exactly parallel with the axis of the spiral in which case it will be a straight line.

According to the disclosed embodiment, the embossments 52 of the first section 32 are arranged in a geometrical pattern which is identical with the geometrical pattern in which the embossments 54 of the second section 34 of support material are arranged, except that the patterns are angularly off-set with respect to each other to insure the aforesaid different spacing apart of directly opposed embossments along any given directional line. As can be determined from a study of FIGS. 1 and 2, the patterns are angularly off-set or rotated 90° with respect to each other. The angle with which one pattern is off-set or rotated with respect to the other is not critical, as long as it is more than a merely de minimus angle which will achieve the non-interdigitating precepts of this invention. It is conceivable that embossments arranged in purely randon non-geometrical fashion would by the laws of chance achieve non-interdigitating patterns, although predetermined patterns are preferred to insure the beneficial results attainable by use of the present invention.

Figure 5:
FIG. 5 is an enlarged sectional elevational view showing first and second sections of membrane material and the manner in which they are supported by first and second sections of support material according to this invention to define passages for blood and dialysate; and, FIG. 6 is a perspective view, with parts broken away, showing the support material of this invention as it may be employed in a dialyzer coil for use in artificial kidney machines.

With particular reference to FIG. 5, which illustrates the basic operational interrelationship of the elements of this invention, the first section 26 of membrane material and the second section 28 of membrane material are positioned in close opposition to each other to provide between their inner surfaces a passage 30 for blood. The first section 32 of support material is positioned adjacent the first section 26 of membrane material, and the second section 34 of support material is positioned adjacent the second section 34 of membrane material, to define the passage 30 for the blood between the inner surfaces of the sections of membrane material, and also to provide passage 36 for dialysate against the outer surfaces of the sections of membrane material and around the embossments 52, 54 respectively. The summits of the embossments 52 engage the outer surface of the first section 26 of membrane material, and the summits of the embossments 54 engage the outer surface of the second section 28 of membrane material to produce contact, such as at 56, between the first and second sections of membrane material at spaced intervals within the blood passage 30. The embossments are arranged in patterns which produce such contact at regularly spaced intervals, which are considerably greater than the lateral spacing between adjacent individual embossments, for controlling the average thickness dimension of the blood passage 30.

The engagement between the summits of the embossments and the outer surfaces of the membrane material also permit generally uniform, multi-axial distention of the sections of membrane material into the passage 36 for the dialysate surrounding each embossment for controlling the effective permeability of the sections of membrane material. Membrane materials for blood dialysis, as is well known, are micro-porous and thus includes a vast multitude of sub-microscopic openings, the size of which depends upon the type of dialysis for which the membrane is intended. It will be appreciated that stretching or distending such membrane material along a single axis results in the elongation in that direction, but the resultant squeezing in the normal direction, of each pore — which in effect tightens the pores and renders the material less permeable. By use of the spaced embossments according to this invention, however, the membrane is stretched or distented between the summit of any given embossment and the summits of the several surrounding embossments in a fashion which produces multi-axial distention. This serves to enlarge each tiny pore in a generally uniform fashion without the squeezing effect produced by uni-axial distention, as when membrane is uni-directionally stretched between parallel strands of a netting support, or between parallel ribs of support material of the type disclosed in Carter U.S. Pat. No. 3,687,293 issued Aug. 29, 1972, for coil type dialyzers or somewhat analagous interrupted parallel ribs of Boe U.S. Pat. No. 3,762,555 issued Oct. 2, 1973, and Esmond U.S. Pat. No. 3,490,523 issued Jan. 20, 1970, for flat plate type dialyzers.

With continued reference to FIG. 5, it can be seen that the embossments 52 of the first section 32 of support material and the embossments 54 of the second section 34 of support material are arranged in patterns to avoid interdigitation of the summits which would substantially occlude the passage 36 for the blood, and also the passage for dialysate. This is because the embossments 52 are spaced apart differently than the directly opposed embossments 54, since the patterns in which they are formed are angularly off-set with respect to each other.

There has thus been disclosed an embossed support for membrane material, which does not make use of intersecting strands arranged in the form of either a woven mesh or a non-woven netting, consisting essentially of a large number of tiny protruding embossments arranged in geometrical patterns which are different on opposite sides of the blood passage so that the summits of the embossments on one side of the blood passage are spaced apart differently along any given directional line than the directly opposed summits of the embossments on the other side. This positively avoids interdigitation of the summits to an extent which would substantially and undesirably occlude the blood passage, all without the necessity of providing special expensive and/or cumbersome positioning or spacing features to insure against such unacceptable interdigitation. Reference to the above identified patents is recommended for a more complete understanding and appreciation of the merits of the present invention.

While the above described embodiment constitutes the presently preferred mode of practicing this invention, other embodiments and equivalents are fairly included within the scope of the basic inventive concept, which is claimed as:

1. A mass transfer device comprising a first section of membrane material and a second section of membrane material positioned in close opposition to each other to provide between their inner surfaces a passage for one fluid, a first section of support material adjacent the first section of membrane material and a second section of support material adjacent the second section of membrane material to define the passage for the one fluid between the inner surfaces of the sections of membrane material and to provide passage for another fluid against the outer surfaces of the sections of membrane material, the first section of support material including a plurality of embossments the summits of which engage the outer surface of the first section of membrane material and the second section of support material including a plurality of opposed embossments the summits of which engage the outer surface of the second section of membrane material to produce contact between the first and second sections of membrane material at spaced intervals within the passage for the one fluid for controlling the thickness dimension of the passage for the one fluid and to permit multi-axial distention of the sections of membrane material into the passage for the other fluid surrounding each embossment for controlling the effective permeability of the sections of membrane material, the improvement being characterized in that the embossments of the first section of support material and the embossments of the second section of support material are constructed and arranged in predetermined patterns so that the embossments of the first section of support material are spaced apart differently along any given directional line than the directly opposed embossments of the second section of support material whereby to avoid interdigitation of the opposed summits which would substantially occlude the passage for the one fluid.

2. A mass transfer device as in claim 1 wherein the embossments of the first section of support material are arranged in a geometrical pattern which is identical with the geometrical pattern in which the embossments of the second section of support material are arranged, and the patterns are angularly off-set with respect to each other to insure the aforesaid different spacing apart of directly opposed embossments along any given directional line.

3. A mass transfer device as in claim 2 wherein the membrane material takes the form of a flattened tube, one side providing the first section of membrane material and the other side providing the second section of membrane material positioned in close opposition thereto to provide between their inner surfaces the passage for the one fluid inside the tube.

4. A mass transfer device as in claim 2 wherein the first and second sections of membrane material are rolled up in a spiral with the first and second sections of support material so that the passage for the one fluid may accommodate blood in smooth flow between the inner surfaces of the sections of membrane material, and passage for the other fluid may accommodate dialysate in turbulent flow around the embossments and against the outer surfaces of the sections of membrane material, thereby forming a dialyzer coil for use in artificial kidney machines.

5. A dialyzer coil for use in artificial kidney machines as in claim 4 wherein the embossments of each section of support material are of substantially equal size, and each embossment has a width dimension at its base which is larger than the height dimension between its base and summit.

6. A dialyzer coil for use in artificial kidney machines as in claim 4 wherein the embossments of each section of support material are of substantially equal size, and each embossment at its base takes the shape of a regular polygon and merges to a smoothly rounded summit.

7. A dialyzer coil for use in artificial kidney machines as in claim 4 wherein the first and second sections of support material are integrally formed as a single sheet of support material including embossments protruding from each side thereof arranged in patterns as aforesaid so that the summits of the embossments on one side avoid interdigitation with the summits of the embossments on the other side when the sheet of support material is rolled up in a spiral.

8. A dialyzer coil for use in artificial kidney machines as in claim 7 wherein the passage for the blood is relatively long and spirally directed and essentially linear in cross-section, passage for the dialysate is relatively short and axially directed and spiral in cross-section, means are provided for connecting each end of the spiral passage for the blood with tubing for communication with the circulatory system of a patient, and means are provided for connecting each end of the axial passage for the dialysate with the dialysis system of an artificial kidney machine.

9. A dialyzer coil for use in artificial kidney machines as in claim 8 wherein the membrane material takes the form of a flattened tube, one side providing the first section of membrane material and the other side providing the second section of membrane material positioned in close opposition thereto to provide between their inner surfaces the spiral passage for the blood inside the tube, the sheet of support material is located outside the flattened tube and is rolled up in a spiral therewith to provide axial passage for the dialysate, the sheet of support material is formed of plastic and is radially impervious to dialysate, the embossments protruding from one side of the sheet of support material are of substantially equal size to each other and also to the embossments protruding from the other side, and each embossment has a width dimension at its base which is approximately twice as large as the height dimension between its base and summit.

\* \* \* \* \*